United States Patent Office.

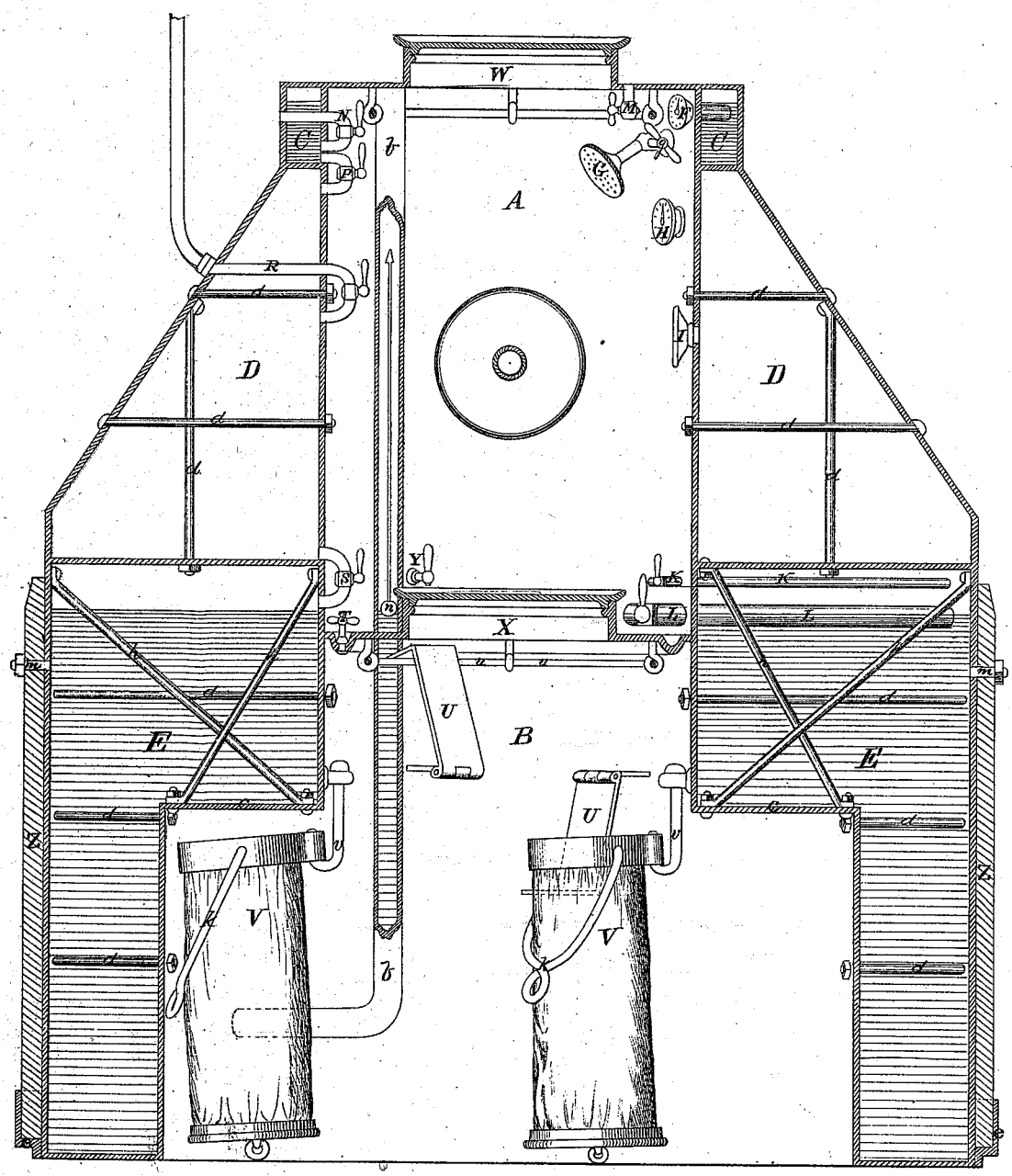

HENRY C. BILLINGS, OF BROOKLYN, NEW YORK.

Letters Patent No. 97,862, dated December 14, 1869.

IMPROVEMENT IN DIVING-BELLS.

The Schedule referred to in these Letters Patent and making part of the same.

*To all whom it may concern:*

Be it known that I, HENRY C. BILLINGS, of Brooklyn, in the county of Kings, and State of New York, have invented a new and valuable Improvement in Diving-Bells; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my invention, in central vertical section.

My invention relates to diving-bells, and consists, mainly, in the construction and novel arrangement of devices designed to serve efficient purposes in submarine explorations.

My diving-bell is constructed of the usual form and size, with double walls. The external wall is cylindrical in its lower portion. Above, it takes the form of a truncated cone. The interior wall consists of a large cylinder, surmounted by a smaller one. The interior wall is connected to the outer wall, at the top, by a circular plate, having, in the centre, a man-hole or entrance. The two walls are also connected, in the middle, by a diaphragm, L, and at the bottom by an annular plate.

The letter A of the drawings designates the entrance-chamber, or upper working-compartment.

B, the lower working-chamber.

C, a small cylindrical water-chamber in and around the top of the bell, arranged for the purpose of taking up the carbonic-acid gas, generated by the lungs of the workmen inside.

D represents an air-chamber, filled with compressed air through the pipe $a$, connecting the chamber with an air-pump or reservoir upon the dock or vessel.

E designates a water-chamber, the object of which is, by increasing or diminishing the quantity of water therein contained, to regulate and assist the ascent or descent of the diving-bell.

F, a water-gauge, which shows the pressure of water on the surface of the bell, as it sinks or rises, thereby indicating also the number of feet below the surface of the water.

G, a perforated spout, through which the water of chamber C, by turning the cock $g$, may be discharged, thereby sprinkling the working-chambers in such a manner as to absorb the carbonic-acid gas therein generated.

H, an air-gauge, which indicates the pressure of air on the men in chambers A and B.

I, an air-gauge, which gives the pressure of air in the compressed-air chamber D.

K, a pipe, with cock for letting the air out of water-chamber E, and thereby allowing the water to enter through pipe L, when necessary.

M, a cock, whereby the foul air from the interior of the bell is allowed to escape through the upper plate.

N, a pipe, with cock, for letting water into chamber C.

P, a bent pipe, with cock, whereby air is forced into chamber C, from air-chamber D, when it is desired to sprinkle the working-compartments.

R, a pipe, with stop-cock, whereby the air from the air-pump or reservoir on the dock or vessel is conducted into the air-chamber D, when necessary.

S, a bent pipe, with cock, through which, when it is desired to lighten the bell, air is forced into the lower water-chamber E from the compressed-air chamber D.

T, a stop-cock, whereby an equal pressure of air is maintained between the chambers A and B. This opening is also arranged to permit the drippings of water from the sprinkler in the top of chamber A to pass off.

U U represent swinging steps used by the workmen in descending and ascending between the two chambers. These steps can be folded up out of the way when not in actual use.

V V represent the bags or receivers. These are made with iron tops and bottoms, and are arranged to hang upon revolving hinges $v\ v$, so that when filled or not in use, they can be turned back out of the way under the ledge $c$.

W represents the upper man-hole or entrance, opening into chamber A.

X, the man-hole or opening between chambers A and B.

Y represents a pipe, with cock, whereby, when necessary, the surplus pressure of air in chambers A and B may be diminished by allowing the superabundant air to pass into chamber D.

Z Z represent slab-weights, each of which is attached to the outside of the bell by means of a pocket, $e$, and secured by means of a bolt and nut, $m$, in such a manner that by removing the nut, the slab can be taken off at will, thereby rendering the bell lighter. A simple arrangement, such as this is designed to be, is often of the utmost importance.

$b$ represents a water-pipe, connected with the water-chamber E, which passes through chamber B up into chamber A, and is arranged so as to indicate the rise and fall of the water in chamber E, by means of a floating ball, $n$, and arrow. In pursuance of this object, the upper part of the pipe in chamber A is fitted with glass and graduated.

A system of ties, $d\ d$, and braces, $h\ h$, is arranged completely around the bell, between the outer and inner walls, whereby they are strengthened and secured in position.

$k\ k$ represent the bails to which the elevating-ropes are attached when the bags are filled and ready to be hoisted up out of the water.

In order to form an exit for the water in chamber E, a valve is usually arranged, near the lower part of this chamber, and operated by means of a rod connected thereto, and extending diagonally up into chamber A through the wall thereof.

When the steps U U are folded up, they are arranged to catch upon the circular rail $u$, whereby they are supported so that they cannot touch the wall of the bell.

It may be here mentioned that when the bags V V are turned back under the ledge $c$, they cannot become unhinged.

It will be observed that all the mechanism connected with the internal economy of the bell communicates with the upper chamber A. The lower chamber B is thereby left free for the operations of the workmen engaged in filling the bags, blasting, exploring, or other work connected with the object of the submarine descent.

What I claim as my invention, and desire to secure by Letters Patent, is—

1. In combination with the compressed-air chamber D, the water-chamber C, with perforated spout G, arranged in the top of the bell, whereby the working-chambers are sprinkled and carbonic-acid gas absorbed, when necessary, as specified.

2. In combination with the bag V and ledge $c$, a revolving hinge, $v$, constructed and arranged to operate as specified.

3. In combination with the slab-weight Z, a pocket, $e$, secured to the outside of the bell, and bolt and nut $m$, as specified.

4. In a diving-bell, the combination of the circular rail $u$ and the swinging steps U U, when constructed and arranged to operate as specified.

In testimony that I claim the above, I have hereunto subscribed my name, in the presence of two witnesses.

HENRY C. BILLINGS.

Witnesses:
E. W. ANDERSON,
D. D. KANE.